(12) United States Patent
Barre et al.

(10) Patent No.: US 11,994,406 B2
(45) Date of Patent: May 28, 2024

(54) GROUP-BASED TECHNIQUE FOR DYNAMIC LABEL PLACEMENT

(71) Applicant: The Government of the United States of America, as represented by the Secretary of the Navy, Arlington, VA (US)

(72) Inventors: Brent Barre, Covington, LA (US); Norman Schoenhardt, New Orleans, LA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 23 days.

(21) Appl. No.: 17/018,604

(22) Filed: Sep. 11, 2020

(65) Prior Publication Data
US 2022/0082404 A1    Mar. 17, 2022

(51) Int. Cl.
*G01C 21/36* (2006.01)
*G01C 21/00* (2006.01)

(52) U.S. Cl.
CPC ....... *G01C 21/3673* (2013.01); *G01C 21/367* (2013.01); *G01C 21/3863* (2020.08)

(58) Field of Classification Search
CPC ............. G01C 21/367; G01C 21/3673; G01C 21/3863; G01C 21/387; G06T 11/60; G06T 11/206

See application file for complete search history.

(56) References Cited

U.S. PATENT DOCUMENTS

| | | | |
|---|---|---|---|
| 7,131,060 B1 * | 10/2006 | Azuma | G06T 11/60 715/260 |
| 9,361,719 B1 * | 6/2016 | Demura | G06T 11/60 |
| 10,621,770 B1 * | 4/2020 | Docking | G09B 29/106 |
| 2012/0143878 A1 * | 6/2012 | Fendley | G09B 29/102 707/756 |
| 2014/0267282 A1 * | 9/2014 | Ren | G09G 5/391 345/428 |
| 2018/0107346 A1 * | 4/2018 | Wilson | G06F 16/29 |
| 2019/0101397 A1 * | 4/2019 | Belk | G01C 21/3691 |

* cited by examiner

*Primary Examiner* — Bao Long T Nguyen
*Assistant Examiner* — Dylan Brandon Mooney
(74) *Attorney, Agent, or Firm* — US Naval Research Laboratory; Nigel R. Fontenot

(57) ABSTRACT

Systems and methods are provided for label placement that provide necessary information on a map when map features conflict without significantly impacting performance. Embodiments of the present disclosure can handle placement of map labels that vary in size, have prioritized label/feature groupings, apply to point, line, and area features, minimize overlap when there is no more open space, and render fast enough for interactive viewing.

18 Claims, 7 Drawing Sheets

GROUP-BASED TECHNIQUE FOR DYNAMIC LABEL PLACEMENT

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; techtran@nrl.navy.mil, referencing Navy Case Number 108183-US2.

FIELD OF THE DISCLOSURE

This disclosure relates to digital mapping, including labeling for digital geospatial mapping.

BACKGROUND

In many mapping applications, such as those for aeronautical charts, map features (e.g., labels for map features) can become cluttered and/or overlapping. Prior approaches either delete or ignore labels when labels overlap. These techniques have disadvantages because some relevant information is not shown on the map. Other conventional techniques are not feasible for geographic information system (GIS)/moving map applications for performance reasons. For example, a common preprocessing step is the building of a conflict graph, which is expensive. Conventional techniques for label placement fail to provide a solution that provides necessary information on a map when map features conflict without significantly impacting performance.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
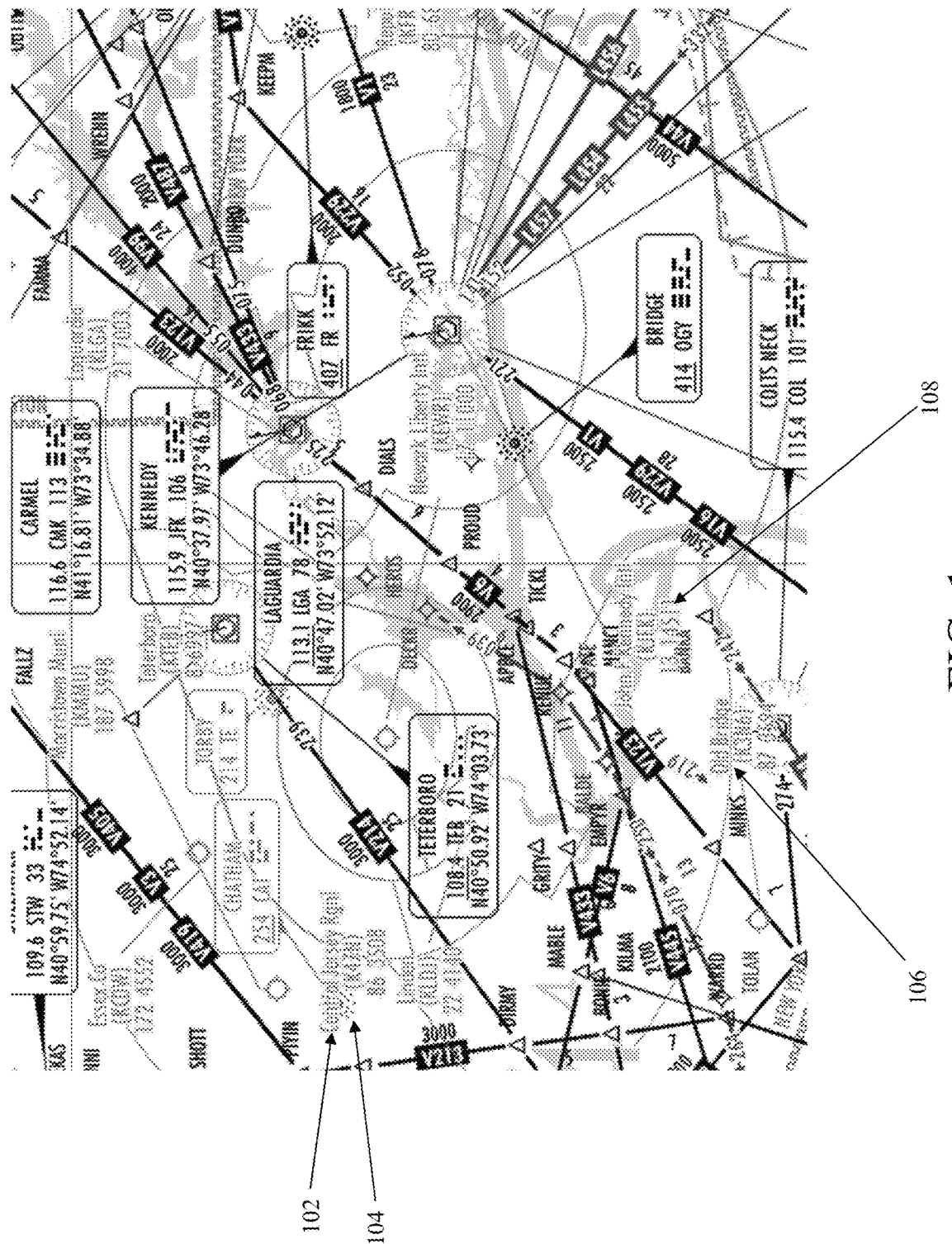
FIG. 1 is a diagram illustrating label conflicts on a map accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Embodiments of the present disclosure provide systems and methods for label placement that provide necessary information on a map when map features conflict without significantly impacting performance. Embodiments of the present disclosure can handle placement of map labels that vary in size, have prioritized label/feature groupings, apply to point, line, and area features, minimize overlap when there is no more open space, and render fast enough for interactive viewing.

FIG. 1 is a diagram illustrating label conflicts on a map accordance with an embodiment of the present disclosure. In FIG. 1, a first label 102 for "Central Jersey Rgn1" conflicts with a second label 104 for a symbol beneath it. Also, in FIG. 1, a third label 106 for "Old Bridge" overlaps other features on the map, and a fourth label 108 for "John F Kennedy Intl" is also drawn as overlapping several other map features.

One technique of resolving these conflicts is to simply omit labels if conflicts are detected. For example, a single R* tree can be used to perform label conflict/overlap detection. In an embodiment, an R* tree is a data structure that provides fast spatial queries by grouping nearby objects using bounding rectangles. In an embodiment, for conflict detection, whenever a new label is to be drawn, the tree first checks for intersection between the new label and labels that it already contains. If any intersection is found, the new label does not get drawn. If no intersection is found, the label gets drawn and added to the tree.

This technique can be acceptable for many charts because the user can zoom in to see more labels. However, this technique is unacceptable for some cases, especially in military applications such as aeronautical charts, because at certain, "official" map scales, all labels must be shown. Prior solutions for showing all labels on a map involve an undesired amount of computation, such as a large amount of preprocessing.

Embodiments of the present disclosure allow label overlap while minimizing it in a prioritized way. For example, a label placement technique in accordance with an embodiment of the present disclosure was used to place labels in FIG. 1. In FIG. 1, for example, first label 102 was allowed to be placed on top of lower priority second label 104 while avoiding placing first label 102 over other higher priority labels. Further, in FIG. 1, nothing is drawn on top of any of the high priority labels (e.g., labels 102, 106, and 108).

Embodiments of the present disclosure use several techniques for efficiently placing labels that improve upon prior methods, including utilizing deconfliction (e.g., declutter) groups, specialized placement search algorithms, and cell-based weighting. For example, in an embodiment, a deconfliction group is a named R* tree that handles only a subset of labels. In this way, multiple groups/R* trees can be used to provide a divide and conquer strategy that is both convenient and functional.

Figure 2:
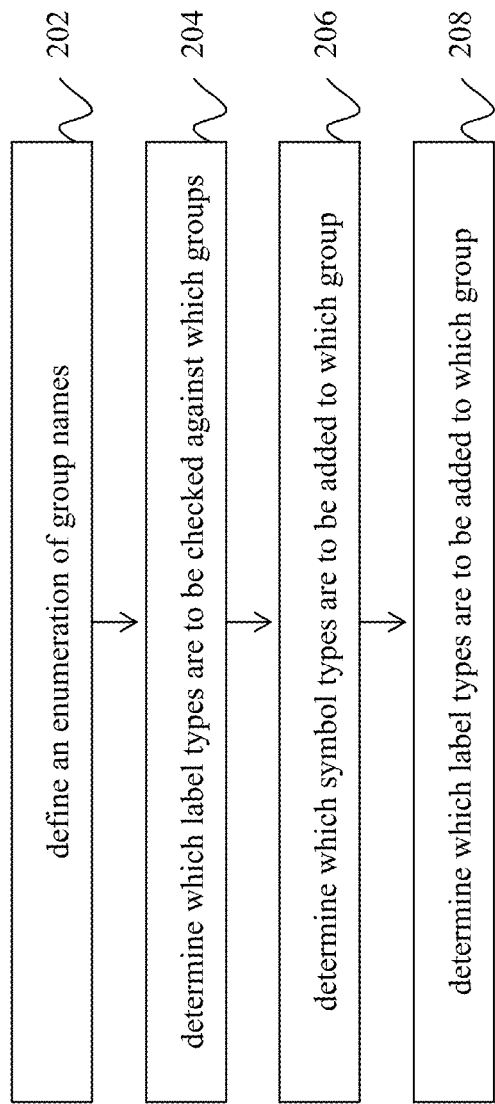
FIG. 2 is a flowchart of an exemplary method for creating and utilizing deconfliction groups in accordance with an embodiment of the present disclosure.

FIG. 2 is a flowchart of an exemplary method for creating and utilizing deconfliction groups in accordance with an embodiment of the present disclosure. In step 202, an enumeration of group names can be defined (e.g., by a programmer, a human user, a system controller, etc.). An example of groups currently used for an aeronautical embodiment are: AIRPORT_LABELS, NAVAID_LABELS, LOW_PRIORITY_LABELS, LINE_SYMBOLS, and POINT_SYMBOLS. In an embodiment, the point symbols group holds symbols, not labels. It can be used when labels are not to overlap certain point symbols. In step 204, a determination can be made regarding which label types are to be checked against which groups. For example, in an embodiment, airport labels can be configured to avoid point symbols and line symbols but can be configured to be drawn over lower priority labels. In step 206, a determination can be made regarding which symbol types are to be added to which group. In step 208, a determination can be made regarding which label types are to be added to which group.

In this way, control can be established over which labels will be aware of each other and which labels will ignore each other. In an embodiment, a user can determine group names, and a system (e.g., a controller) takes care of the creation and management of the R* tree for each group. In an embodiment, the system also provides a convenience query for checking a label against all groups. In an embodiment, these automatic parts of the system and the groups themselves are encapsulated in what is called an overlap manager (OM). In an embodiment, the OM can contain all groups, as well as a framework for easy checking against group combinations or all groups.

In an embodiment, two search algorithms can be used. In an embodiment, one search algorithm searches for placements around a point symbol, and the other searches for placements along a line symbol. Both algorithms can use the same OM to do their conflict detection. In an embodiment, for area label placement, a search is not used, and the label is placed at the area's centroid, but the OM can still be used to check for overlap(s). This highlights the modularity of the OM; it can be coupled with many different label placement algorithms.

In dense areas, sometimes there is no open space for the search algorithm to find, and all placement attempts will encounter overlap. In some embodiments, such as with Aero, labels must still be placed in this scenario. Embodiments of the present disclosure use label weighting as a way to set rules for selecting a winner out of placement attempts which all encounter overlap. In an embodiment, a weight is assigned to each deconfliction group based on its importance: the higher the weight, the more important. The OM can then keep a weighted score for each attempted label position based on the groups that it overlaps, and the position with the lowest score can be selected for label placement. In an embodiment, for greater precision, the OM first divides the label into a 2×4 grid of cells. Thus, the score for a given position becomes the sum of scores of all 8 cells.

For example, in an embodiment, given a feature and a label, the search algorithm can attempt every position for the label (e.g., around/along the feature). For each label position, the current label pixel bounds can be divided into cells (e.g., smaller bounds). Each cell can be checked to get weights of whichever groups the cell overlaps, adding them together to get a cell overlap score. All cell scores can be added together to get the total overlap score for the label position. The label position with the lowest total overlap score can then be selected.

2. Deconfliction Groups

An example of creating deconfliction groups will now be discussed. In an embodiment, an Overlap Manager can be configured (e.g., by a developer, controller, predetermined system settings, etc.) by creating classifier names/tags for any deconfliction groups needed and by assigning the weight to each group based on the priorities (e.g., priorities decided by the chart developer, a controller, system settings, etc.). In an embodiment, the classification tags can be as specific as desired, but for the purposes of an example, the following tags can be used (from lowest priority/weight to highest priority/weight): point symbols, line symbols, low priority labels, and high priority labels (e.g., airport labels).

In an embodiment, a tag or tags can be used to determine the deconfliction group(s) to which point symbols will belong (e.g., a "POINT_SYMBOLS" tag). In an embodiment, an overlap manager accordingly initializes a data structure (such as an R* Tree) named POINT_SYMBOLS, to which the point symbols can be added for fast conflict/intersection checking. This data structure can be referred to as a deconfliction group. In an embodiment, the same procedure can be performed for line symbols. For example, in an embodiment, the LINE_SYMBOLS tag/deconfliction group can be used. As illustrated by the POINT_SYMBOLS and LINE_SYMBOLS tags, deconfliction groups can also be used to group labels by geometry. For example, labels that are used to label a single point in a map can be assigned to the POINT_SYMBOLS deconfliction group, and labels that are used to label a line on a map can be assigned to the LINE_SYMBOLS deconfliction group.

Some labels (e.g., area and line labels) may be less prominent on the chart, or more like background in nature, and may be deemed low priority by the chart developer. In an embodiment, a tag, such as a LOW_PRIOITY_LABELS tag, can be used to group such labels. Similarly, a tag, such as HIGH_PRIORITY_LABELS, can be used to group together higher priority labels (e.g., labels that are not grouped with the lower priority labels), and these labels can be assigned a relatively high weight. In an embodiment, for high priority labels, the deconfliction groups to avoid can be specified (e.g., by a developer, controller, predetermined system settings, etc.) for each high priority label. In an embodiment, all high priority labels can be specified to avoid the same deconfliction groups. In an embodiment, each high priority label (or groups of high priority labels) can be specified to avoid different deconfliction groups. For example, in an embodiment, high priority airports labels can be specified to avoid point symbols and line symbols. In an embodiment, the tags-to-avoid can be provided to a space search algorithm. In an embodiment, low priority labels can be ignored by certain label types and thus may be drawn over.

In an embodiment, for each position attempted by the search algorithm (e.g., for an airport label), a check can be made against the given deconfliction groups, and a conflict score can be calculated for the position (e.g., via a call to the Overlap Manager). In the score calculation, the overlap manager can use the weights discussed above to further enforce avoidance of higher priority labels. For example, in an embodiment, conflict with labels from groups of higher weight/priority contributes more to the score. In an embodiment, the label can be placed at the position of the lowest conflict score. In an embodiment, label priorities can be changed later (e.g., by a developer, controller, predetermined system settings, etc.) and labels can be added to a deconfliction group of choice for use in any subsequent deconfliction.

3. Map Label Placement

Figure 3:
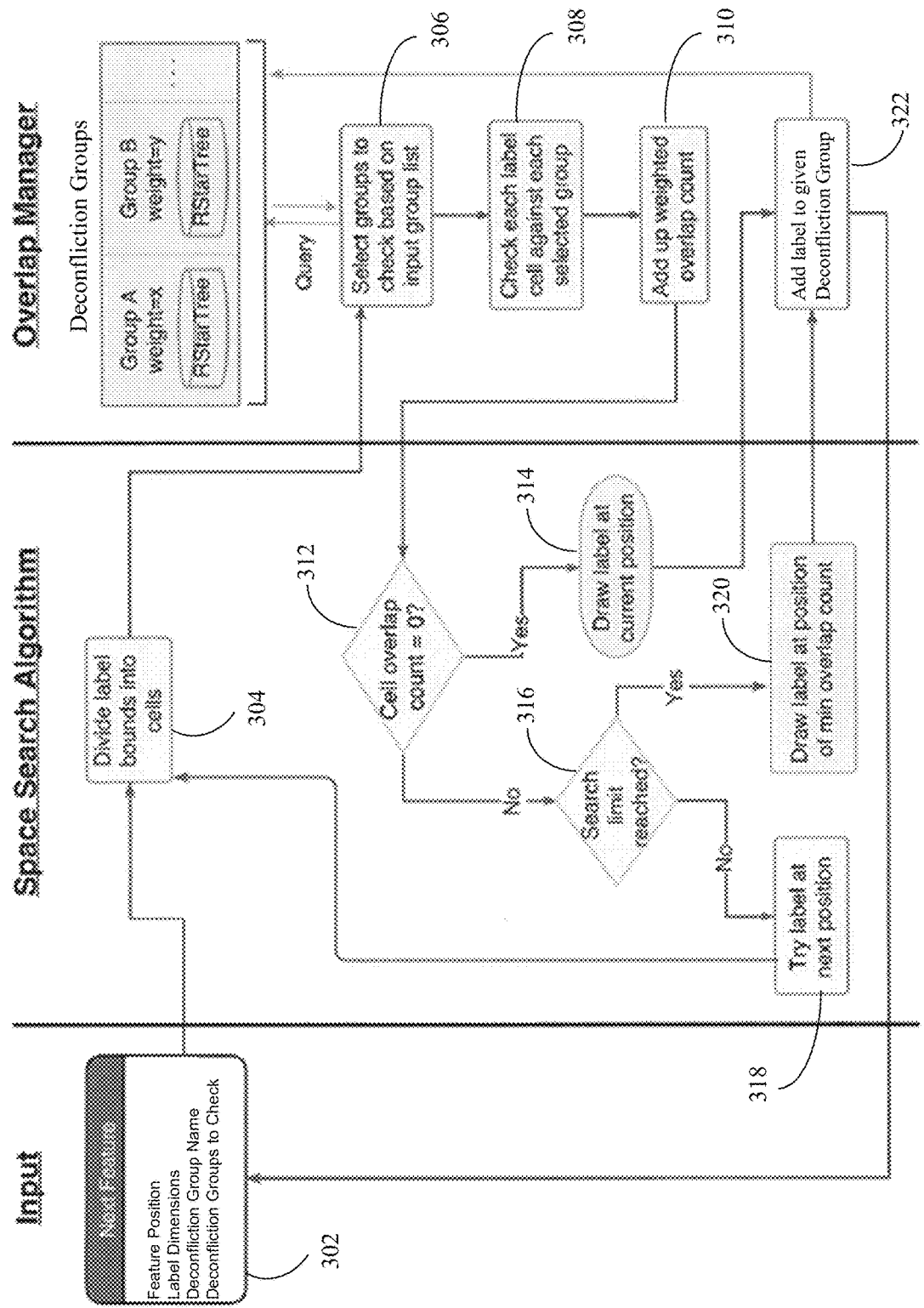
FIG. 3 is a flowchart of a method for label placement in accordance with an embodiment of the present disclosure.

FIG. 3 is a flowchart of a method for label placement in accordance with an embodiment of the present disclosure. In step 302, input attributes for a feature to be drawn are received (e.g., by a computer program and/or by a system implementing label placement in accordance with an embodiment of the present disclosure). In an embodiment, these attributes include the position of the feature (e.g., the location and/or coordinates of the central point of the feature), the label dimensions (e.g., a bounding box, length, width, height, radius, and/or any other geometric characteristics necessary to draw the feature given the central position of the feature), the deconfliction group name, and deconfliction groups to check. In an embodiment, a predetermined threshold can be set as a maximum distance to be searched for label placement. In an embodiment, each label for each feature to be placed is first assigned a deconfliction group and deconfliction groups to be checked against (e.g., using the method described above with reference to FIG. 2) before placing the feature on the map. In an embodiment, the steps of FIG. 2 can be performed by an overlap manager (OM), described in more detail below.

In step 304, the label bounds are divided into cells. For example, in an embodiment, the label bounds refer to an (invisible) pixel-based outline of the label that is being moved to each attempted pixel position of the search algorithm. In other words, the label bounds represent what the label footprint would be at a candidate position. In an embodiment, labels are placed within a maximum geographical (and/or spatial) range around the coordinates of the geographical (and/or spatial) feature, and a location for each label is selected based on conflicts with other labels. In an embodiment, the maximum range for placing a label can be a predetermined ranged (e.g., set by a programmer and/or user). In an embodiment, this predetermined range can be adjustable (e.g., by a programmer and/or a user).

In an embodiment, the label bounds can be divided based on the received feature position and dimensions. In an embodiment, the label bounds can be divided into a predetermined number of cells. In an embodiment, a cell can be assigned a predetermined size, and the label bounds can be divided based on how many cells of the predetermined size can fit inside the label bounds (e.g., larger label bounds can be configured to be divided into more cells than smaller label bounds).

In step 306, groups to check can be selected based on groups in the list of groups to check input in step 302. In an embodiment, each label type can be set to avoid specific other label types, as discussed above. For example, in an embodiment, airports labels can be specified to avoid point symbols and line symbols. In step 308, each label cell can be checked against each selected group. For example, in an embodiment, each cell can be checked to get the weights of whichever groups the cell overlaps. In step 310, the weighted overlap score can be added up. For example, in an embodiment, the weights of all the groups the cell overlaps can be added together to get a cell overlap weight score.

In step 312, a determination is made regarding whether the cell overlap score is zero. If the cell overlap score is zero, the method proceeds to step 314, where a label is drawn at the current position (e.g., because there are no conflicts for the label). If the cell overlap score is nonzero, a conflict for the label is detected, and the method proceeds to step 316. In step 316, a determination is made regarding whether a search limit has been reached. For example, in an embodiment, a search algorithm in accordance with an embodiment of the present disclosure can check every position for the label around/along the feature (e.g., within the maximum geographical range around the coordinates of the geographical feature). In an embodiment, once the last position around/along the feature has been checked, the search limit of step 316 has been reached. In step 318, if the search limit has not been reached, the method proceeds to step 304.

In step 320, if the search limit has been reached, the label is drawn at the position of minimum overlap score. For example, in an embodiment, if there is nowhere to place the feature without some overlap, the cell with the minimum overlap score can be selected. For example, in an embodiment, a label will "draw over" prior labels if there is no open space. In an embodiment, deconfliction group weights and the overlap score can be used to determine which labels to draw over.

In step 322, once the cell with the minimum overlap score is determined, the label is added to the deconfliction group/R* Tree given as "deconfliction group name" in step 302. In the future, when future labels are checked against this deconfliction group/R* Tree, the current label may show up in the deconfliction group/R* Tree query results (R Trees return any objects whose bounding boxes intersect a given query bounding box).

Figure 4:
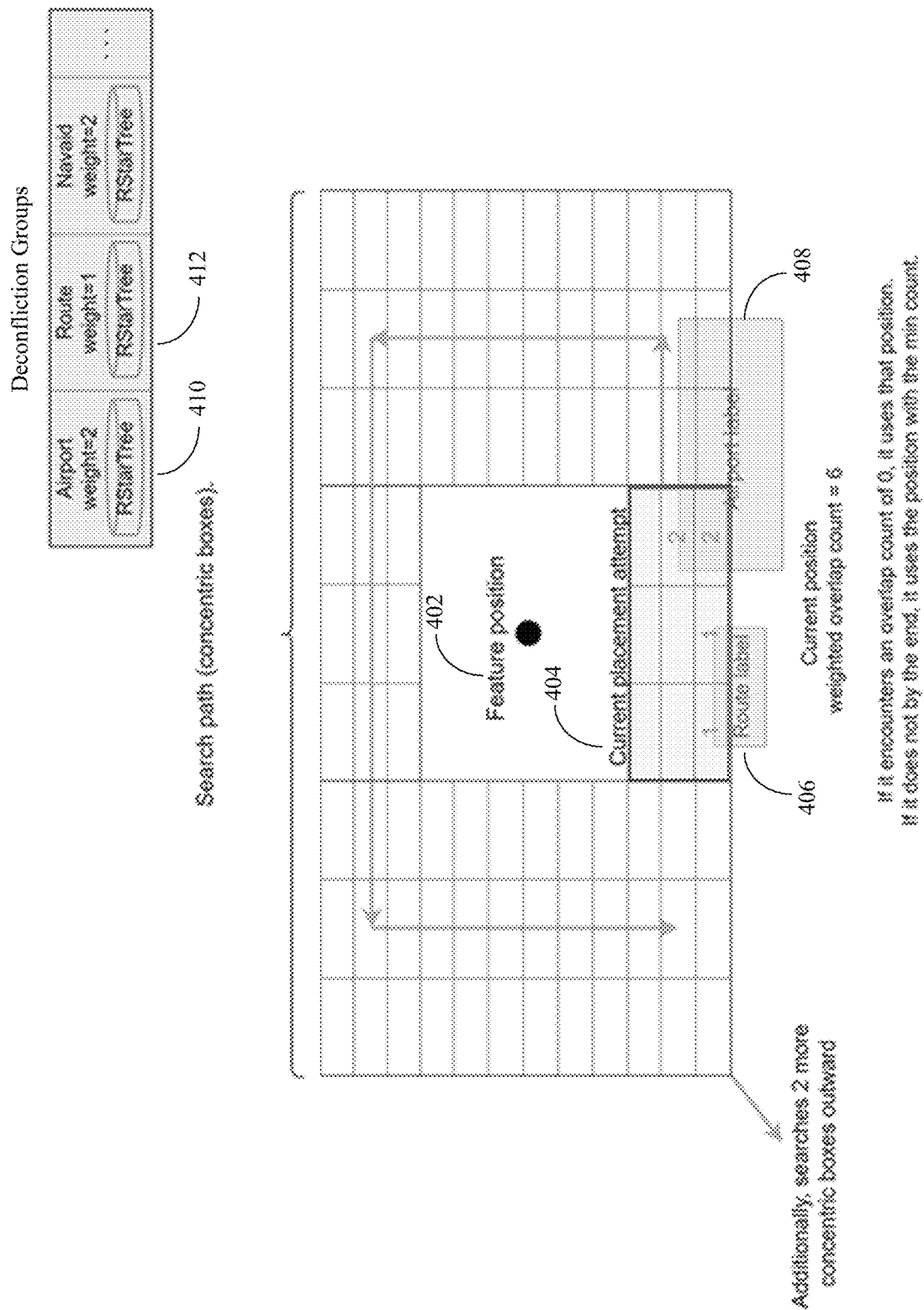
FIG. 4 is a diagram illustrating an exemplary label placement in accordance with an embodiment of the present disclosure.

FIG. 4 is a diagram illustrating an exemplary label placement in accordance with an embodiment of the present disclosure. In FIG. 4, a feature with feature position 402 is received. The feature can then be placed using the method described above with reference to FIG. 3. In FIG. 4, for placement attempt 404, conflicts are shown with route label 406 and airport label 408. As shown in FIG. 4, route label 406 has corresponding weight 412, and airport label 408 has corresponding weight 410. Potential placement positions are searched for areas around feature position 402 until the best spot is located (e.g., selected using the method described above with reference to FIG. 3).

4. Exemplary Map Label Placement Systems

Figure 5:
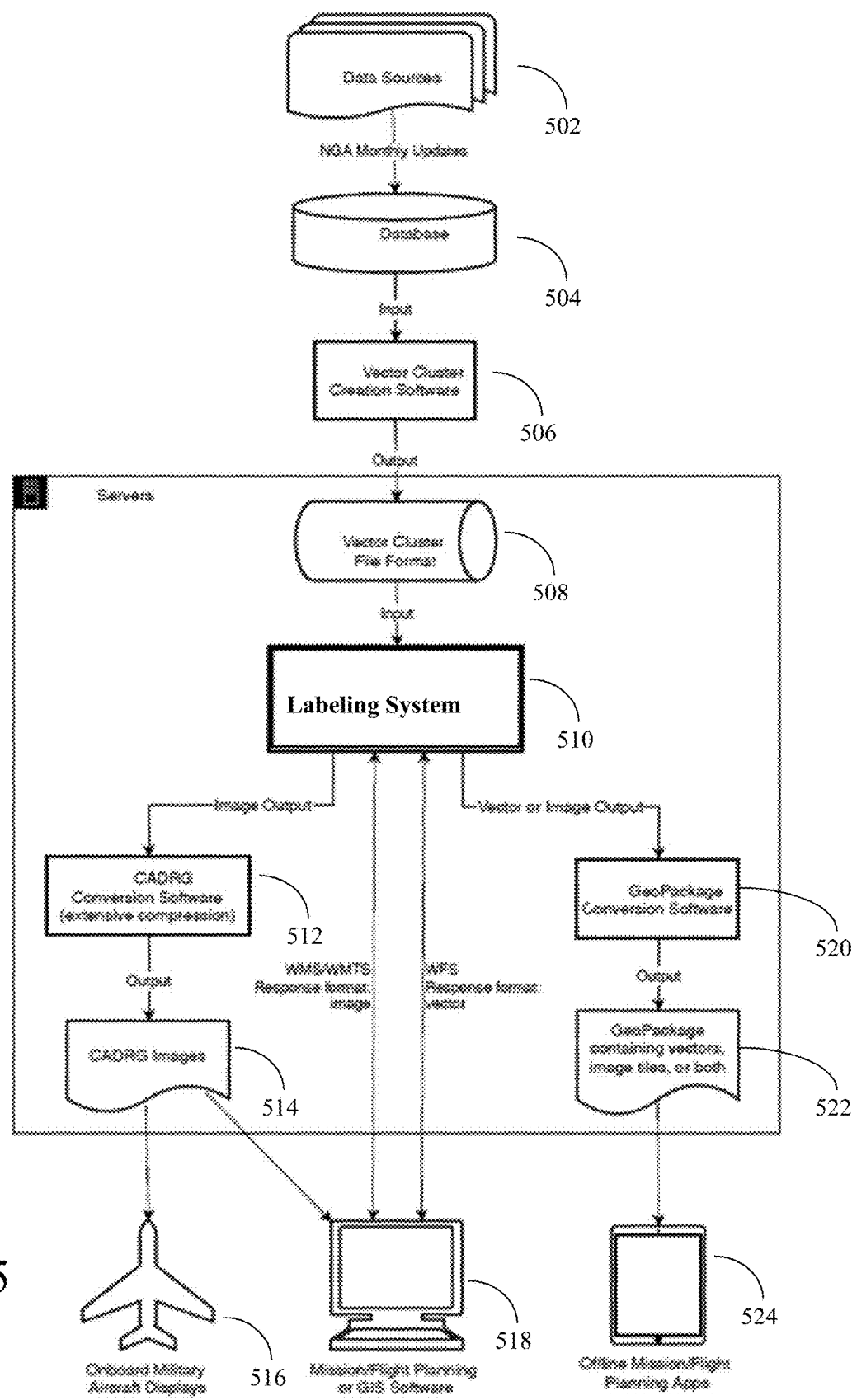
FIG. 5 is an exemplary system diagram for label placement in accordance with an embodiment of the present disclosure.

FIG. 5 is an exemplary system diagram for label placement in accordance with an embodiment of the present disclosure. In FIG. 5, data from data sources 502 (e.g., aeronautical data sources) can be sent to a database 504

(e.g., via periodic updates, such as daily, weekly, and/or monthly updates) to create a database of data used for labels. Database 504 can include geographic information, spatial information, and/or any other information used by labeling system 510 in accordance with embodiments of the present disclosure. Database 504 can be any data storage device in accordance with embodiments of the present disclosure. Database 504 can be implemented using hardware, software and/or a combination of hardware and software in accordance with embodiments of the present disclosure. Database 504 can be implemented as a standalone device (e.g., a standalone special purpose labeling device) or can be integrated into a host device (e.g., a special purpose host device or a general purpose computer).

In an embodiment, using information in this database, vector clusters containing geographical (and/or spatial) data can be created using vector cluster software 506 and vector cluster file format 508. In an embodiment, these vector clusters can be passed as input to labeling system 510. In an embodiment, labeling system 510 can be configured to select positions for data from these vector clusters to be drawn on a map (and/or produce the map) using, for example, the methods described above with reference to FIGS. 2 and 3. In an embodiment, database 504 can send periodic updates to labeling system 510 with data from data sources 502 (e.g., vector cluster information generated from data sources 502). In an embodiment, labeling system 504 can be configured to send a request to database 504 for data from database 504 prior to receiving information from database 504.

Image output from labeling system 510 can be sent to one or more output devices for display. For example, in FIG. 5, image output from labeling system 510 can be sent to conversion software 512 for compression and production of images 514, which can be used by aircraft displays 516 (e.g., military aircraft displays) and/or mission, flight planning, or geographic information system (GIS) software 518. In an embodiment, mission, flight planning, or GIS software 518 can also communicate with labeling system 510 via web map service (WMS), web feature service (WFS), and/or web map tile service (WMTS) requests and responses. Vector or image output from labeling system 510 can also be sent to conversion software 520, which can produce a package 522 containing vectors, image tiles, or both for output to offline mission/flight planning applications 524.

Figure 6:
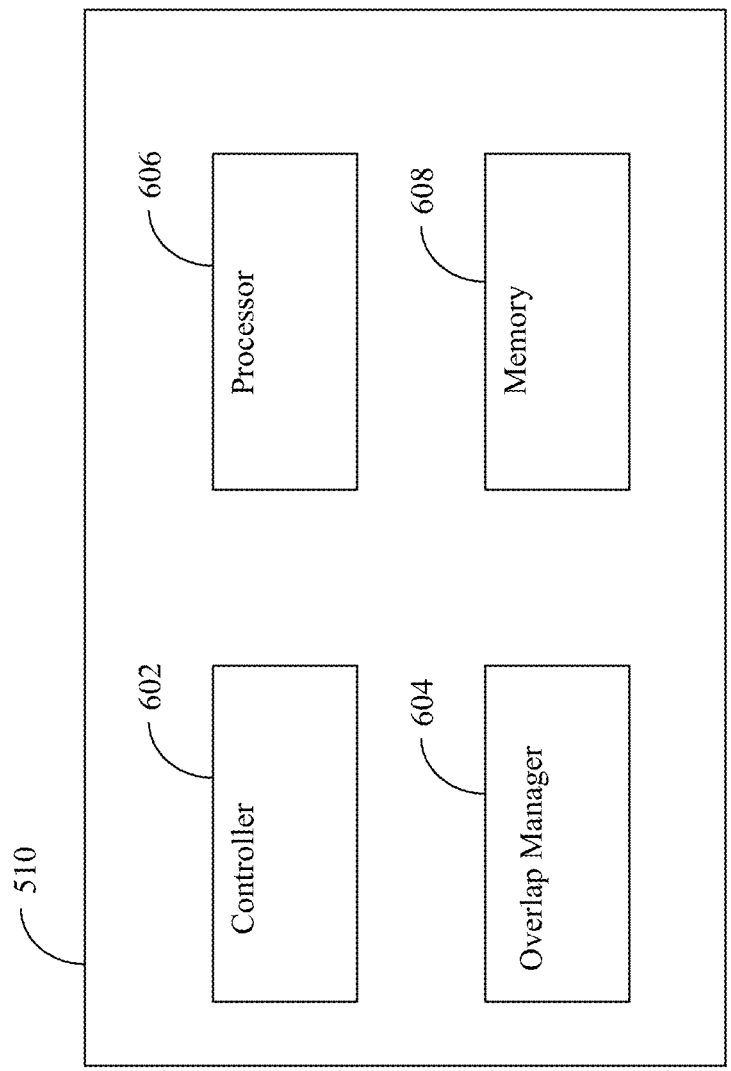
FIG. 6 is a diagram of an exemplary labeling system in accordance with an embodiment of the present disclosure.

FIG. 6 is a diagram of an exemplary labeling system 510 in accordance with an embodiment of the present disclosure. In FIG. 6, labeling system 510 includes a controller 602 that can be configured to perform some or all of the steps described above with reference to FIG. 2 and/or FIG. 3. In an embodiment, labeling system 510 can also include a separate overlap manager 604 that can be configured to perform, for example, steps of FIG. 2 and steps 306, 308, 310, and 322 of FIG. 3. In an embodiment, overlap manager 604 can be implemented as part of controller 602. In an embodiment, labeling system 510 also includes a processor 606 and one or more memories 608 that can be used by controller 602 and/or overlap manager 604 perform operations (e.g., the operations of FIG. 2 and/or FIG. 3).

For example, in an embodiment, controller 602 can receive input from database 504 (e.g., in vector cluster file format 508) at step 302 of FIG. 3. In an embodiment, controller 602 can be configured to perform some or all of the steps of FIG. 3 to determine where labels should be placed for the received input and can generate image output or vector output to be used by conversion software 512 or 520. Using the output generated by controller 602, maps can be generated for use by aircraft displays 516 mission, flight planning, or GIS software 518, and offline mission/flight planning applications 524.

Labeling system 510 can be implemented using hardware, software, and/or a combination of hardware and software. Labeling system 510 can be implemented using one device or multiple devices. Labeling system 510 can be implemented as a standalone device (e.g., a standalone special purpose labeling device) or can be integrated into a host device (e.g., a special purpose host device or a general purpose computer).

5. Exemplary Methods for Map Label Placement Using Deconfliction Groups

Figure 7:
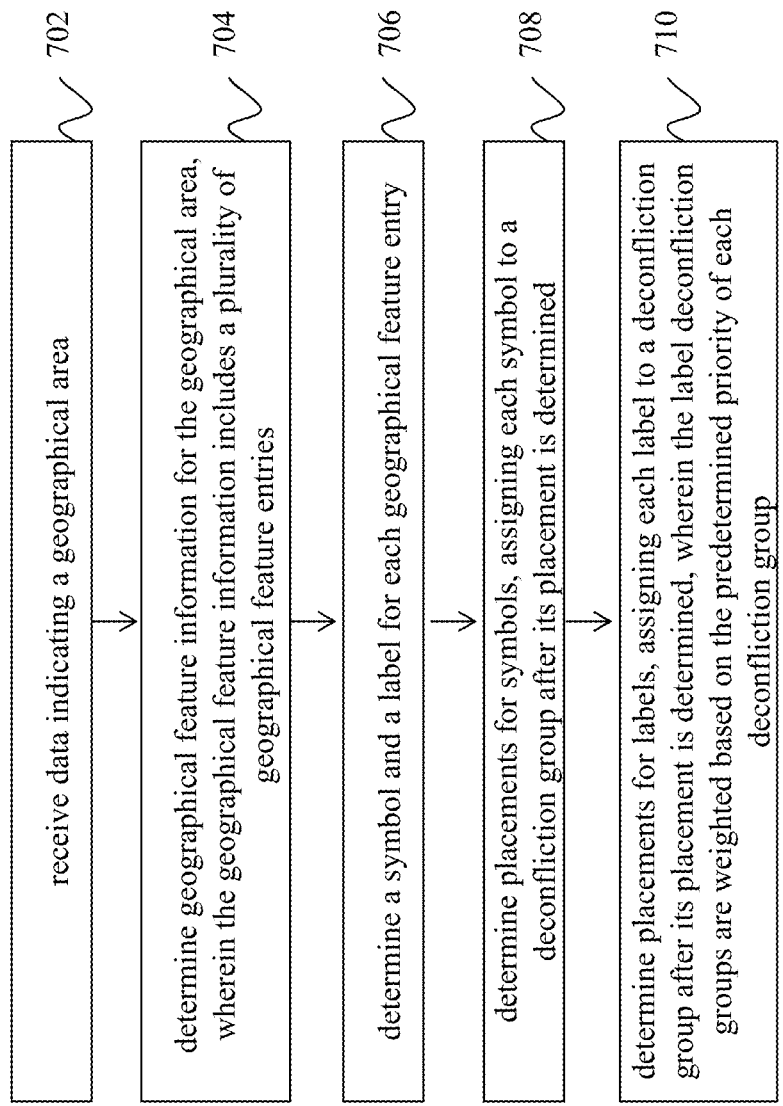
FIG. 7 is a flowchart of an exemplary method for map label placement using deconfliction groups in accordance with an embodiment of the present disclosure.

FIG. 7 is a flowchart of an exemplary method for map label placement using deconfliction groups in accordance with an embodiment of the present disclosure. In an embodiment, the methods of FIG. 7 are performed by controller 602 and/or overlap manager 604 of labeling system 510. In step 702, data indicating a geographical area (and/or any spatial area) is received. In an embodiment, a user can supply a geographical area for label placement. For example, a user can draw a bounding box around a geographical area on a map for label placement and supply it to labeling system 510 and/or specify a geographical area (e.g., using latitude and longitude coordinates).

In step 704, geographical feature information (and/or any spatial feature information) for the geographical area (and/or spatial area) is determined. In an embodiment, once the user supplies data indicating the geographical area to labeling system 510, labeling system 510 can search an internal database of geographical feature entries that correspond to this geographical area. For example, in an embodiment, data sources 502 send periodic updates to database 504, which can be used to a create vector cluster, which can be input to labeling system 510. In an embodiment, labeling system 510 can search the vector cluster file for geographical feature entries that correspond to the geographical area. In an embodiment, the geographical features found in this search are stored in memory 608. In an embodiment, labeling system 510 can send a request to database 504 for geographical feature information that corresponds to the geographical area, and database 504 can send a response to labeling system 510 containing geographical feature entries.

In step 706, a symbol and a label for each geographical feature entry (and/or spatial feature entry) are determined. For example, in an embodiment, geographical feature entries contain information that labeling system 510 can use to generate symbols and labels. In an embodiment, geographical feature entries contain key value pairs that labeling system 510 can parse for symbol and label information, as well as geographical coordinates for these key value pairs. In an embodiment, each geographical feature entry corresponds to a single symbol and a single label (e.g., an airport symbol and an airport name).

In step 708, placement for symbols is determined (e.g., placement on a map or chart), and after the placement for each symbol is determined, each symbol is assigned to a deconfliction group. In an embodiment, each symbol is placed at the location of its geographical feature. In an embodiment, labeling system 510 determines the placement for all symbols for the geographical area before determining the placement for the first label. In an embodiment, after the placement for a symbol is determined, the symbol is added to a symbol deconfliction group. In an embodiment, although symbols are allowed to conflict with each other, symbols are added to deconfliction groups so that labels can be instructed to avoid these symbol deconfliction groups. In an embodiment, each symbol deconfliction group is assigned a priority or weight.

In step 710, placements for labels are determined, and after the placement of each label is determined, each label is assigned to a deconfliction group. In an embodiment, placements for these labels can be determined using the method of FIG. 3. In an embodiment, placements for labels can be determined by checking against a predetermined set of deconfliction groups, wherein the label deconfliction groups are weighted based on the predetermined priority of each deconfliction group, and each label can be assigned to a deconfliction group after its placement is determined.

In an embodiment, a user and/or programmer can define predetermined deconfliction groups and can assign each deconfliction group a weight. In an embodiment, after a placement for a symbol is determined, the symbol is added to symbol deconfliction group based on information in the geographical feature entry that corresponds to the symbol. For example, in an embodiment, an airport symbol has information in its geographical feature entry indicating that it is an airport, and labeling system 510 can parse this geographical feature entry, determine, based on this parsed information, that the symbol is an airport symbol, and assign the symbol to a deconfliction group for airport symbols based on this determination. In an embodiment, airport information can also be assigned to another group. For example, in an embodiment, an airport could be assigned to a group or point symbols in general (e.g., a group for airports, navaids, and/or waypoints).

In an embodiment, because placements for symbols are determined first, as labeling system 510 is determining a placement location for each label, labeling system 510 can be instructed to avoid placing the label next to symbols that have been placed into specific deconfliction groups. For example, each label can be associated with a geographical feature entry, and, labeling system 510 can parse the geographical feature entry to determine a label type for the label (e.g., labeling system 510 can determine that a label has a label type of "airport label" based on information labeling system 510 parses from the geographical feature entry associated with the label). In an embodiment, labeling system 510 can instruct labels of predefined types to avoid symbols (or other labels that have already been placed) of other predefined types.

Labeling system 510 can then search for areas within the maximum geographical (and/or spatial) range around the coordinates of the geographical feature that are not already occupied by symbols and labels that the label to be placed has been instructed to avoid. If there are no unoccupied places to place the label, labeling system 510 can place the label in the cell that has the minimum weighted overlap score. In an embodiment, once the label has been placed, it is added to a deconfliction group (e.g., based on parsed information in the geographical feature entry associated with the label), and the next label is processed.

In an embodiment, a label position that has the minimum weighted overlap score is selected based on determining: (1) the set of deconfliction groups against which the label should check for intersection (i.e. groups to avoid); (2) whether cells within a label intersect with any polygon in the deconfliction groups (e.g., whether polygonal cells within the label intersect with polygons of symbols and labels that were previously added to the deconfliction groups); and (3) weights for each deconfliction group intersected. Specifically, in an embodiment, to place a single label, the set of one or more label positions ($P_{min}$) that have the minimum weighted overlap can be represented by Equation (1):

$$P_{min} = \{p_i \in P | f(p_i) = \min\{f(p_0), f(p_1), \ldots, f(p_n)\}\} \quad (1)$$

In Equation (1), $p_i$ is in the sequence of candidate label positions, $P=\{p_0, p_1, \ldots, p_n\}$, ordered by distance from the feature being labeled, and $f(p_i)$ is the weighted overlap sum of all label cells at position $p_i$. In an embodiment, $f(p_i)$ can be represented by Equation (2):

$$f(p_i) = \sum_{j=0}^{q} \sum_{k=0}^{r} w_k \times g(c_j, d_k) \quad (2)$$

In Equation (2), cell polygon $c_j$ is in the set of cell polygons $\{c_0, c_1, \ldots, c_q\}$ (e.g. a grid) into which the label outline polygon (at position $p_i$) is divided. In Equation (2), deconfliction group $d_k$ is in the set of deconfliction groups $\{d_0, d_1, \ldots, d_r\}$ that the label has been instructed to avoid, with each group containing a set of outline polygons (of symbols or labels) that have been placed prior to the current placement procedure. In Equation (2), weight $w_k$ is in the set of weights $\{w_0, w_1, \ldots, w_r\}$ one weight for each deconfliction group, and g is a binary intersection function that returns 0 if $c_j$ and $d_k$ do not intersect, or 1 if they do. In this function, $c_j$ is said to intersect $d_k$ if and only if $c_j$ intersects any of the polygons in $d_k$.

In an embodiment, once all labels and symbols have been placed, labeling system 510 can send the placement information to an output device to be rendered and displayed to a user. For example, in an embodiment, output of labeling system 510 can be loaded on one or more aircraft displays 516, GIS software 518, and/or to mission/flight planning applications 524, as illustrated by FIG. 5. In an embodiment, this placement information can be used as a navigational tool (e.g., for pilots, ship captains, automobile drivers, ground control operators, etc.).

6. Exemplary Advantages

Embodiments of the present disclosure provide necessary information on a map when map features conflict without significantly impacting performance, which is especially useful for applications where all labels must be shown on a map, such as Aero. Embodiments of the present disclosure allow near print quality for completely dynamic maps, are computationally efficient, and will greatly reduce cartographic workload when used for print type products.

Embodiments of the present disclosure can move labels around to avoid each other (e.g., depending on their type/group). More labels are usually visible on-screen as a result. Airport and navaid labels, for example, can be placed many pixels away from the features they belong to, in any direction. This allows spaced to be filled that might go unused with standard methods. Due to the possible distance between label and feature, thin pointer lines are drawn between them to keep them visually paired.

7. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A system for label placement, the system comprising:
a data storage device configured to store spatial feature information; and
a labeling device, in communication with the data storage device, wherein the labeling device is configured to:
receive the spatial feature information,
receive data indicating a spatial area,
determine a plurality of spatial feature entries in the spatial feature information that correspond to the spatial area,
determine a symbol and a label for each spatial feature entry in the plurality of spatial feature entries,
determine a plurality of symbol placements on a map for each symbol in the plurality of symbols,
assign each symbol to a respective symbol deconfliction group in a plurality of symbol deconfliction groups after respective placements for each symbol have been determined, wherein each respective symbol is assigned to each respective symbol deconfliction group based on a respective spatial feature entry in the plurality of spatial feature entries that corresponds to each respective symbol,
determine a plurality of groups to avoid for each label in the plurality of labels based on respective spatial feature entries in the plurality of spatial feature entries that correspond to each label,
determine a minimum overlap score for a plurality of candidate label positions for each label in the plurality of labels based on a set of cell polygons into which respective label outline polygons for labels in the plurality of labels are divided, the plurality of groups to avoid, a plurality of weights assigned to the plurality of symbol deconfliction groups, and an intersection function corresponding to a potential intersection of the set of cell polygons and the plurality of groups to avoid,
determine a plurality of label placements on the map for each label in the plurality of labels based on the plurality of groups to avoid, the minimum overlap score, and the plurality of weights assigned to the plurality of symbol deconfliction groups, wherein responsive to determining that there is no open space for a first one of the plurality of labels without overlap, the labeling device is configured to determine that the corresponding label placement for the first one of the plurality of labels be placed over a prior label on the map in a location having the candidate label position having the minimum overlap score corresponding to the first one of the plurality of labels, wherein determination of the prior label on the map is based on the plurality of weights assigned to the plurality of symbol deconfliction groups, and
send the plurality of symbol placements and the plurality of label placements to an output device, wherein the sent plurality of label placements includes the label placement to be placed over the prior label on the map.

2. The system of claim 1, wherein the labeling device is further configured to:
assign each label to a respective label deconfliction group in a plurality of label deconfliction groups after respective placements for each label have been determined, wherein the labeling device is configured to assign each respective label to each respective label deconfliction group based on a respective spatial feature entry in the plurality of spatial feature entries that corresponds to each respective label.

3. The system of claim 2, wherein the labeling device is further configured to:
determine symbol intersections based on determining whether polygons of each label in the plurality of labels intersect with polygons of each symbol in each symbol deconfliction group in the plurality of symbol deconfliction groups;

determine label intersections based on determining whether polygons of each label in the plurality of labels intersect with polygons of each label in each label deconfliction group in the plurality of label deconfliction groups; and determine the minimum overlap score for the plurality of candidate label positions for each label in the plurality of labels based on the symbol intersections and the label intersections.

4. The system of claim 3, wherein the labeling device is further configured to:

determine the minimum overlap score for the plurality of candidate label positions for each label in the plurality of labels based on the equation $P_{min} = \{p_i \in P | f(p_i) = \min\{f(P_0), f(P_1), \ldots, f(P_n)\}\}$, wherein $P_{min}$ is a set of one or more label placements that have a minimum weighted overlap score, $p_i$ is in the sequence of candidate label positions, $P = \{p_0, p_1, \ldots, p_n\}$, ordered by distance from the feature being labeled, and $f(p_i)$ is the weighted overlap sum of all label cells at position $p_i$.

5. The system of claim 4, wherein the labeling device is further configured to:

determine $f(p_i)$ based on the equation $f(p_i) = \Sigma_{j=0}^{q} \Sigma_{k=0}^{r} w_k \times g(c_j, d_k)$, wherein $c_j$ is in the set of cell polygons $\{c_0, c_1, \ldots, c_q\}$ into which a label outline polygon for a label in the plurality of labels is divided, $d_k$ is in the set of deconfliction groups $\{d_0, d_1, \ldots, d_r\}$ that the label has been instructed to avoid, $w_k$ is in the set of weights for the plurality of symbol deconfliction groups and the plurality of label deconfliction groups, and g is a binary intersection function that returns 0 if $c_j$ and $d_k$ do not intersect, or 1 if $c_j$ and $d_k$ intersect.

6. The system of claim 5, wherein the minimum overlap score is determined by the plurality of weights assigned to the plurality of symbol deconfliction groups and the plurality of label deconfliction groups, and wherein the plurality of deconfliction groups intersect with the plurality of candidate label positions for each label in the plurality of labels.

7. A method for label placement, the method comprising:

receiving, using a processing device, data indicating a spatial area;

determining, using the processing device spatial feature information for the spatial area, wherein the spatial feature information includes a plurality of spatial feature entries;

determining, using the processing device, a symbol and a label for each spatial feature entry in the plurality of spatial feature entries;

determining, using the processing device, a plurality of symbol placements on a map for each symbol in the plurality of symbols;

assigning, using the processing device, each symbol to a respective symbol deconfliction group in a plurality of symbol deconfliction groups after respective placements for each symbol have been determined, wherein each respective symbol is assigned to each respective symbol deconfliction group based on a respective spatial feature entry in the plurality of spatial feature entries that corresponds to each respective symbol;

determining, using the processing device, a plurality of groups to avoid for each label in the plurality of labels based on respective spatial feature entries in the plurality of spatial feature entries that correspond to each label;

determining, using the processing device, a minimum overlap score for a plurality of candidate label positions for each label in the plurality of labels based on a set of cell polygons into which respective label outline polygons for labels in the plurality of labels are divided, the plurality of groups to avoid, a plurality of weights assigned to the plurality of symbol deconfliction groups, and an intersection function corresponding to a potential intersection of the set of cell polygons and the plurality of groups to avoid;

determining, using the processing device, a plurality of label placements on the map for each label in the plurality of labels based on the plurality of groups to avoid, the minimum overlap score, and the plurality of weights assigned to the plurality of symbol deconfliction groups, wherein responsive to determining that there is no open space for a first one of the plurality of labels without overlap, determining that the corresponding label placement for the first one of the plurality of labels be placed over a prior label on the map in a location having the candidate label position having the minimum overlap score corresponding to the first one of the plurality of labels, wherein determination of the prior label on the map is based on the plurality of weights assigned to the plurality of symbol deconfliction groups; and sending, using the processing device, the plurality of symbol placements and the plurality of label placements to an output device, wherein the sent plurality of label placements includes the label placement to be placed over the prior label on the map.

8. The method of claim 7, further comprising:

assigning each label to a respective label deconfliction group in a plurality of label deconfliction groups after respective placements for each label have been determined, wherein each respective label is assigned to each respective label deconfliction group based on a respective spatial feature entry in the plurality of spatial feature entries that corresponds to each respective label.

9. The method of claim 8, further comprising:

determining symbol intersections based on determining whether polygons of each label in the plurality of labels intersect with polygons of each symbol in each symbol deconfliction group in the plurality of symbol deconfliction groups;

determining label intersections based on determining whether polygons of each label in the plurality of labels intersect with polygons of each label in each label deconfliction group in the plurality of label deconfliction groups; and determining the minimum overlap score for the plurality of candidate label positions for each label in the plurality of labels based on the symbol intersections and the label intersections.

10. The method of claim 9, further comprising:

determining the minimum overlap score for the plurality of candidate label positions for each label in the plurality of labels based on the equation $P_{min} = \{p_i \in P | f(p_i) = \min\{f(p_0), f(p_1), \ldots, f(p_n)\}\}$, wherein $P_{min}$ is a set of one or more label placements that have a minimum weighted overlap score, $p_i$ is in the sequence of candidate label positions, $P = \{p_0, p_1, \ldots, p_n\}$, ordered by distance from the feature being labeled, and f($p_i$) is the weighted overlap sum of all label cells at position $p_i$.

11. The method of claim 10, further comprising:
determining f($p_i$) based on the equation f($p_i$)=$\Sigma_{j=0}^{q}\Sigma_{k=0}^{r}w_k \times g(c_j, d_k)$, wherein $c_j$ is in the set of cell polygons {$c_0, c_1, \ldots, c_q$} into which a label outline polygon for a label in the plurality of labels is divided, $d_k$ is in the set of deconfliction groups {$d_0, d_1, \ldots, d_r$} that the label has been instructed to avoid, $w_k$ is in the set of weights for the plurality of symbol deconfliction groups and the plurality of label deconfliction groups, and g is a binary intersection function that returns 0 if $c_j$ and $d_k$ do not intersect, or 1 if $c_j$ and $d_k$ intersect.

12. A system for label placement, the system comprising:
a data storage device configured to store spatial feature information; and
a labeling device, in communication with the data storage device, wherein the labeling device is configured to:
receive the spatial feature information,
receive data indicating a spatial area,
determine a plurality of spatial feature entries in the spatial feature information that correspond to the spatial area,
determine a symbol and a label for each spatial feature entry in the plurality of spatial feature entries,
determine a plurality of symbol placements on a map for each symbol in the plurality of symbols,
assign each symbol to a respective symbol deconfliction group in a plurality of symbol deconfliction groups after respective placements for each symbol have been determined, wherein each respective symbol is assigned to each respective symbol deconfliction group based on a respective spatial feature entry in the plurality of spatial feature entries that corresponds to each respective symbol,
determine a minimum overlap score for a plurality of candidate label positions for each label in the plurality of labels based on a set of cell polygons into which respective label outline polygons for labels in the plurality of labels are divided, a plurality of groups to avoid, a plurality of weights assigned to the plurality of symbol deconfliction groups, and an intersection function corresponding to a potential intersection of the set of cell polygons and the plurality of groups to avoid, and
determine a plurality of label placements on the map for each label in the plurality of labels based on the minimum overlap score, the plurality of weights assigned to the plurality of symbol deconfliction groups, and a plurality of weights assigned to the plurality of label deconfliction groups, wherein responsive to determining that there is no open space for a first one of the plurality of labels without overlap, the labeling device is configured to determine that the corresponding label placement for the first one of the plurality of labels be placed over a prior label on the map in a location having the candidate label position having the minimum overlap score corresponding to the first one of the plurality of labels, wherein determination of the prior label on the map is based on the plurality of weights assigned to the plurality of symbol deconfliction groups.

13. The system of claim 12, wherein the labeling device is further configured to:
assign each label to a respective label deconfliction group in the plurality of label deconfliction groups after respective placements for each label have been determined, wherein the labeling device is configured to assign each respective label to each respective label deconfliction group based on a respective spatial feature entry in the plurality of spatial feature entries that corresponds to each respective label.

14. The system of claim 12, wherein the labeling device is further configured to:
determine symbol intersections based on determining whether polygons of each label in the plurality of labels intersect with polygons of each symbol in each symbol deconfliction group in the plurality of symbol deconfliction groups;
determine label intersections based on determining whether polygons of each label in the plurality of labels intersect with polygons of each label in each label deconfliction group in the plurality of label deconfliction groups; and
determine the minimum overlap score for the plurality of candidate label positions for each label in the plurality of labels based on the symbol intersections and the label intersections.

15. The system of claim 12, wherein the labeling device is further configured to:
determine the minimum overlap score for the plurality of candidate label positions for each label in the plurality of labels based on the equation $P_{min}$={$p_i \in P | f(p_i)$=min{f($P_0$), f($P_1$), ..., f($P_n$)}}, wherein $P_{min}$ is a set of one or more label placements that have a minimum weighted overlap score, $p_i$ is in the sequence of candidate label positions, P={$P_0, p_1, \ldots, p_n$}, ordered by distance from the feature being labeled, and f($p_i$) is the weighted overlap sum of all label cells at position $p_i$.

16. The system of claim 15, wherein the labeling device is further configured to:
determine f($p_i$) based on the equation f($p_i$)=$\Sigma_{j=q}\Sigma_{k=0}^{r}w_k \times g(c_j, d_k)$, wherein $c_j$ is in the set of cell polygons {$c_0, c_1, \ldots, c_q$} into which a label outline polygon for a label in the plurality of labels is divided, $d_k$ is in the set of deconfliction groups {$d_0, d_1, \ldots, d_r$} that the label has been instructed to avoid, $w_k$ is in the set of weights for the plurality of symbol deconfliction groups and the plurality of label deconfliction groups, and g is a binary intersection function that returns 0 if $c_j$ and $d_k$ do not intersect, or 1 if $c_j$ and $d_k$ intersect.

17. The system of claim 12, wherein the minimum overlap score is determined by the plurality of weights assigned to the plurality of symbol deconfliction groups and the plurality of label deconfliction groups.

18. The system of claim 17, wherein the plurality of deconfliction groups intersect with the plurality of candidate label positions for each label in the plurality of labels.

* * * * *